C. MACBETH AND F. FELLOWES.
MACHINE FOR MAKING PNEUMATIC TIRE COVERS OR CASINGS.
APPLICATION FILED JAN. 31, 1921.
1,397,133.
Patented Nov. 15, 1921.
3 SHEETS—SHEET 1.
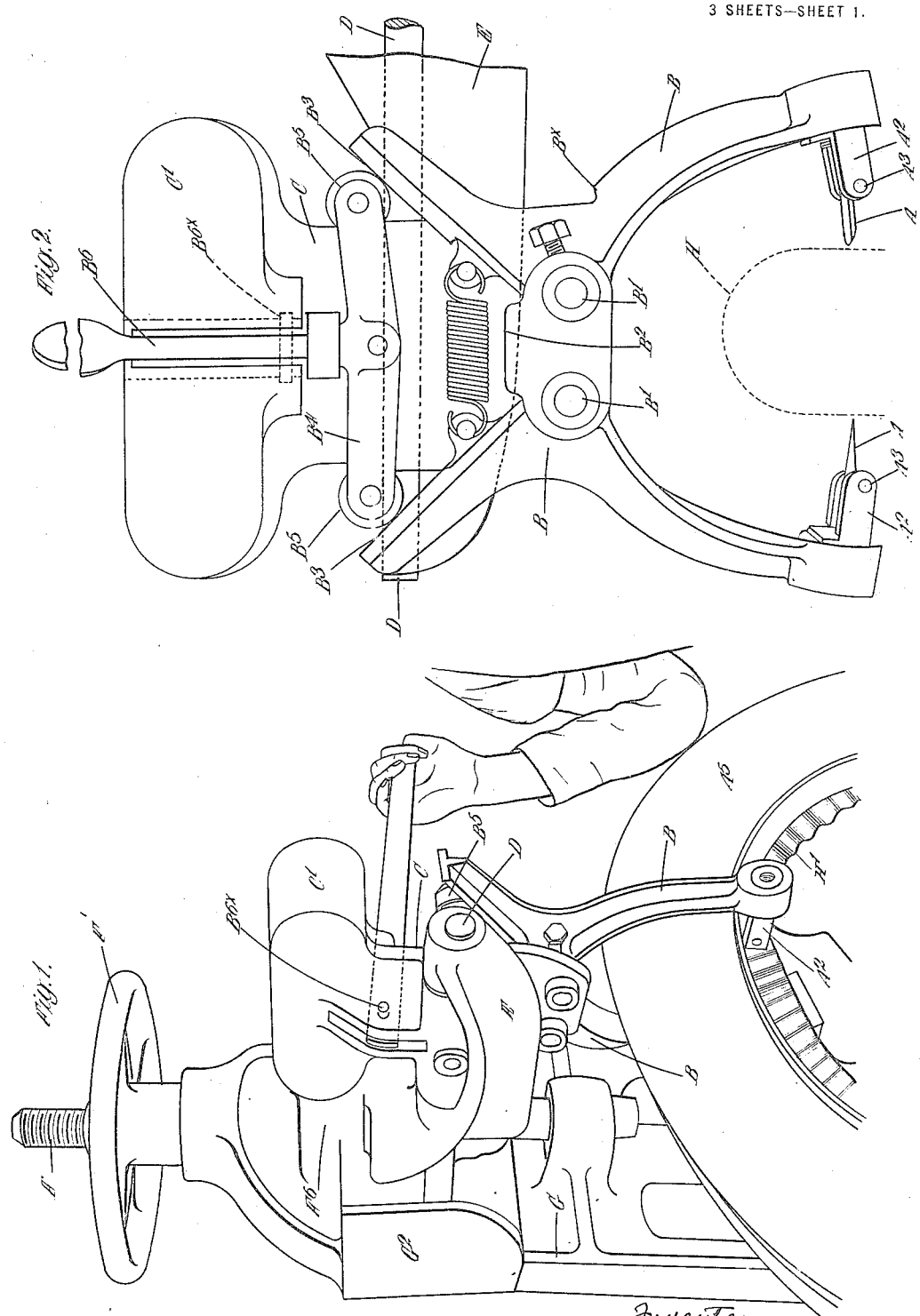

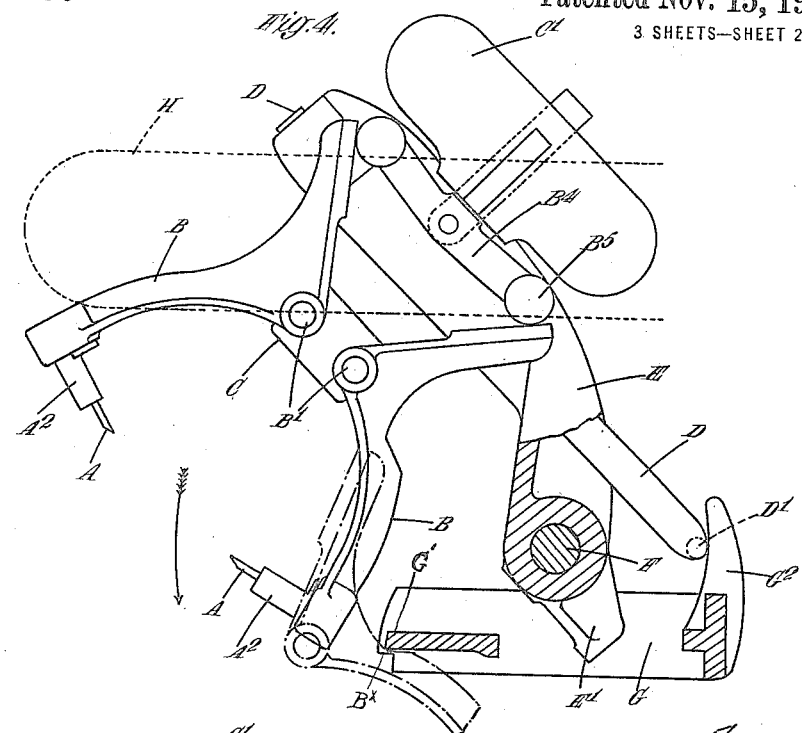
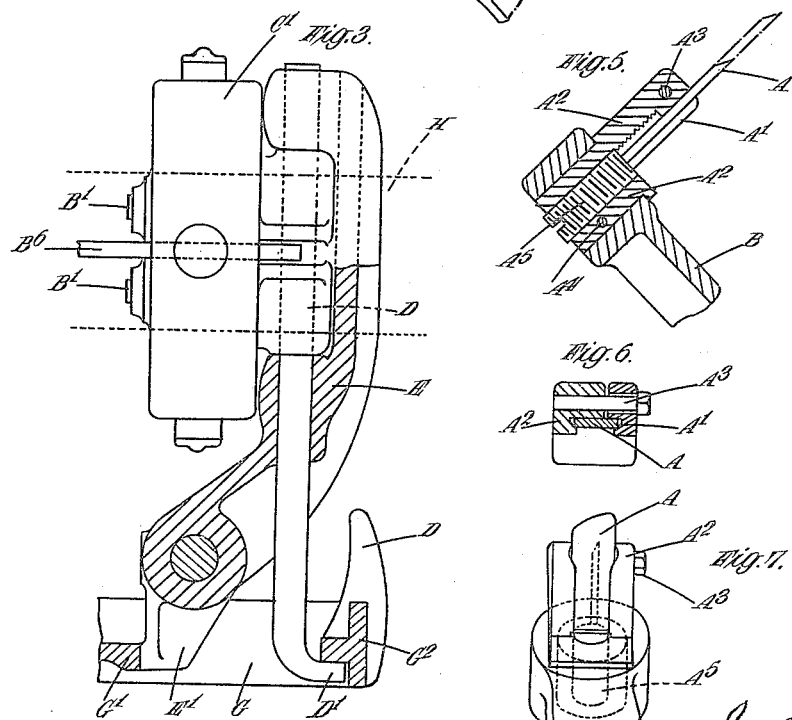
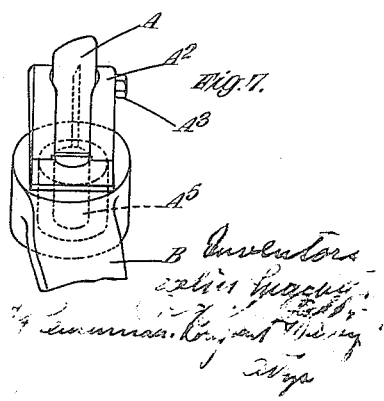

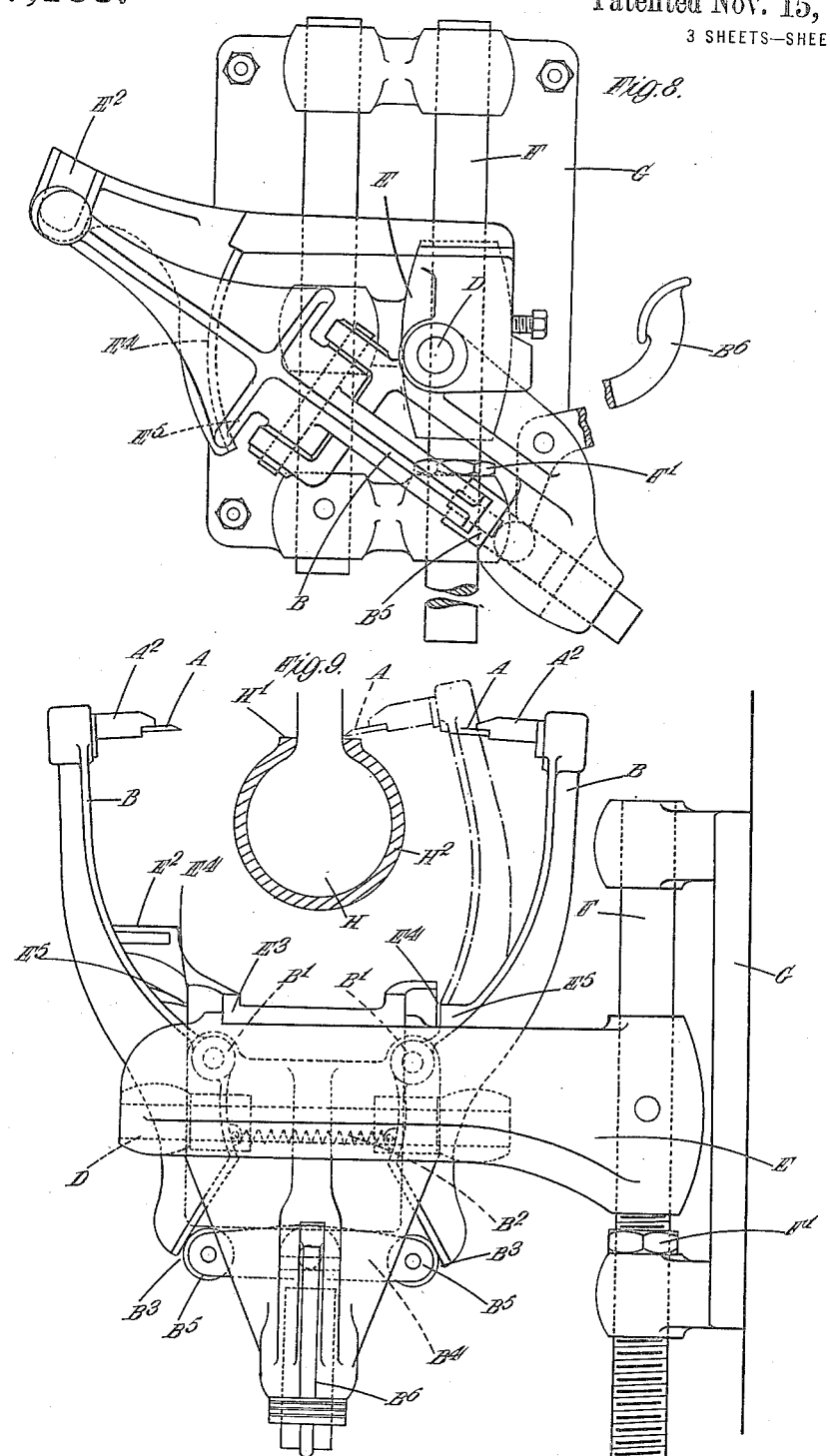

UNITED STATES PATENT OFFICE.

COLIN MACBETH AND FRANK FELLOWES, OF BIRMINGHAM, ENGLAND, ASSIGNORS TO THE DUNLOP RUBBER COMPANY, LIMITED, OF WESTMINSTER, LONDON, ENGLAND, A BRITISH COMPANY.

MACHINE FOR MAKING PNEUMATIC-TIRE COVERS OR CASINGS.

1,397,133.  Specification of Letters Patent.  Patented Nov. 15, 1921.

Application filed January 31, 1921. Serial No. 441,464.

*To all whom it may concern:*

Be it known that we, COLIN MACBETH and FRANK FELLOWES, both subjects of the King of Great Britain, both residing at Fort Dunlop, Erdington, Birmingham, in the county of Warwick, England, have invented certain new and useful Improvements in or Relating to Machines for Making Pneumatic-Tire Covers or Casings, (for which we have filed application in England, No. 1,005, dated Jan. 12, 1920,) of which the following is a specification.

This invention relates to machines for making pneumatic tire covers or casings (which machines are generally known as case making machines) and has particular reference to devices for trimming or cutting the surplus material at the beads of the casing on the core supported on the rotary spindle of the case making machine.

According to this invention the bead trimming device comprises various improvements which, *inter alia*, (*a*) enable the operator to observe conveniently both the knives or cutters in operation at the same time, (*b*) prevent the operator from pressing and maintaining the knives in the cutting position with excessive pressure, and (*c*) reduce the likelihood of the operator being injured by the knives. The improved device comprises pivoted knife arms or levers carrying the knives or cutters at one end and having at the other end means for laterally moving the knife levers on their pivots to bring the knives into engagement with the surplus material at the beads, the said means being adapted to be actuated by a hand or foot operated lever, and according to one of the features of the present invention the said device is so constructed and arranged that the actuating lever is adapted to be angularly moved in the vertical plane of the core to initially bring the knives into position at the sides of the core ready to be moved into the cutting position, whereupon the movement of the actuating lever in the same direction is continued in order to effect the lateral movement of the knife levers on their pivots to bring the knives into engagement with the surplus material at the beads. Owing to the angular movement of the actuating lever in the vertical plane of the core, the operator in actuating the lever stands in a position looking in the direction of the vertical plane of the core so that he is able to observe both cutting knives in operation, this being particularly so in connection with a modification in which the device is positioned at the lower part of the core and is moved by a foot actuated lever.

According to a further feature of the invention the actuating mechanism is such that a "reduced mechanical advantage" is obtained in moving the knives laterally toward the sides of the core so as to prevent the operator from forcing the knives with undue pressure against the sides of the core during the cutting operation thereby preventing grooving or cutting of the sides of the core by the knives. For this purpose the inner ends of the pivoted knife arms or levers are formed with inclined surfaces and a bar connected to the aforesaid actuating lever is adapted to be forced or wedged between the said inclined surfaces in order to move the knife arms or levers on their pivots against the action of a spring to bring the knives into engagement with the surplus material; by this construction the mechanical advantage is progressively reduced as the said bar approaches the pivots of the knife arms or levers and the operator in depressing the actuating lever experiences or meets with increasing resistance to the depression of the actuating lever; therefore the operator can effect the cutting or trimming operation without unduly forcing the knives against the sides of the core.

According to another feature of the invention the device is so mounted as to be capable of radial adjustment relatively to the core in order to enable the device to be used with cores of different diameters. When the cutting out device is mounted to operate at the upper part of the core the whole device may be moved into an inoperative position in which the knives are placed and locked behind the main frame of the machine which serves as a guard to protect the operator or prevent him from coming into contact with the knives, while in an example of the device suitable for operation at the lower part of the core, the outer knife (or both knives) when moved into the inoperative position are protected by a special guard or shield.

A further object of the invention consists in the providing of means whereby the knives can be readily centralized relative to the core. Improved means are also provided for laterally adjusting or setting the knives in the knife arms or levers to compensate for wear due to sharpening.

In order that the said invention may be clearly understood and readily carried into effect, the same will now be described more fully with reference to the accompanying diagrammatic drawings, in which:—

Figures 1 and 2 are respectively a perspective view and a side or end view of one construction of the cutting out device located at the upper part of the core and in position ready to effect the cutting or trimming operation.

Figs. 3 and 4 are part sectional plan views showing the cutting out device in the cutting position and the inoperative position respectively.

Figs. 5, 6 and 7 are detail views of the adjustable knives.

Figs. 8 and 9 are respectively a front view and a side or end view of the cutting out means located at the lower part of the core. Fig. 8 showing the inoperative position and Fig. 9 the cutting position.

A A are the knives fitted in the ends of arms or levers B B pivoted at B' B' on a plate or frame C which as shown in Figs. 1 to 4 is provided with a counterweight C' and which is secured on a horizontal spindle D angularly movable in a bracket E which is secured on an angularly movable vertical spindle F supported in a fixed frame G which may form part of the case making machine. When the device is in the operative position the aforesaid knife levers B and the plate C are disposed vertically, as shown in Figs. 1, 2 and 3, with the knife levers B straddling the core H so that the knives are disposed practically in line with the beads H' of the casing H² on the core. Normally the lower ends of the knife levers B carrying the knives A are maintained in a position fairly widely spaced away from the core by means of a tension spring B² connected to the knife levers above their pivotal points B' (see Fig. 2). The upper ends of the said knife levers B are provided with inclined surfaces B³ forming an approximately V-shaped space between them as shown in Fig. 2. A bar B⁴ carrying rollers B⁵ at its ends in contact with the inclined surfaces B³ of the knife levers is connected to a hand lever B⁶ which is pivoted at B⁵ˣ to the plate C between the knife levers and in the central plane of the core by depressing the hand lever B⁶, as shown in Fig. 1, the bar B⁴ can be moved downwardly to force the two inclined surfaces B³ of the knife levers farther apart against the action of the spring B², this movement resulting in the lower ends of the knife levers B and the knives A being moved toward each other until the knives engage with the surplus material at the beads which is removed or cut by the rotation of the core while the knives are retained in this position. Owing to the inclined surfaces B³ the resistance to the movement of the knife levers into the cutting position progressively increases and the arrangement is such that the mechanical advantage is progressively reduced thereby preventing the operator from forcing the knives with excessive pressure against the sides of the core so that likelihood of damage to the latter is reduced. After the cutting operation has been effected the knives are allowed to return to the normal position that is, away from the beads, by releasing the hand lever B⁶ so that the spring B² pulls the upper ends of the knife levers toward each other with the result that the lower ends and the knives move away from the beads, and clear of the core and the casing thereon. The plate C carrying the knife levers can then be angularly moved on the axis of the horizontal spindle D into an approximately horizontal position whereupon the bracket E can be angularly moved on the axle of the vertical spindle F in the direction of the arrow shown in Fig. 4 until the ends of the knife levers carrying the knives assume a position at the rear of the main frame G. The knife arms are retained in this position by a stop Bˣ formed on one of them engaging with a part G' of the frame G as shown by dotted lines in Fig. 4, and during the angular movement of the bracket E the outer surface of this knife arm may bear against the frame part G' and be pressed inwardly against the action of the spring until the stop Bˣ moves behind the frame part G'. Thus the cutting out device can be retained in a safe position in which the knives are held well away from the core and casing and the device in this position offers no obstruction to the manipulation of the core and casing as for example when building up the casing on the core.

When it is desired to move the bracket to the position ready for effecting another cutting operation the knife arm engaging with the frame part G' is pulled against the action of the springs B² to bring stop Bˣ out of engagement with the frame part G' so that the bracket E is then free to be angularly moved in the opposite direction through an angle of about 90 degrees. The spindle D which carries the plate C is formed at its inner end with a hooklike portion D' which during the angular movement of the bracket engages with a guide G² on the frame G and prevents angular movement of the spindle and the plate and knife arms carried thereon during the angular movement of the bracket E so that the knife arms are prevented from being moved to the vertical position and coming into contact with the core during the angular movement of the bracket. When, however, the bracket E reaches the proper position, as shown in Fig. 3, a stop E' thereon engages with the frame part G and at this time the aforesaid hook end D' of the spindle has moved out of engagement with the said guide G² so that it is no longer restrained against angular movement thereby enabling the plate C and knife levers B to be moved into the vertical position by lowering the hand lever B⁶ in the vertical plane of the core; the said hook end D' of the spindle at this time lies behind the guide G² on the frame G and thereby locks the bracket E against angular movement. Upon the knife arms assuming the vertical position the hand lever can be depressed in the same direction as aforesaid in order to bring the knives into the cutting position for trimming the surplus canvas or similar material at the beads or edges of the casings on the core. If it should be found that the knives are set inaccurately or that the tire core is not running truly and that one knife may be cutting deeper than the other, these defects may be rectified by the roller bar B⁴ automatically changing its angular position due to being mounted on a spherical shoulder so that it bears unevenly on the inclined parts B³ of the knife levers and thus centralizes the knives with respect to the tire core.

The complete device may be adjusted vertically with respect to the tire core in order that the knives may be set to suit any particular size of tire casing by vertically moving the spindle F on which the aforesaid bracket E is secured. For this purpose the upper end of the spindle F may be threaded to receive a nut which may be in the form of a hand wheel F' supported on a bearing on the main frame G as shown in Fig. 1; by rotating the hand wheel F' the spindle is raised or lowered according to the direction of rotation of the hand wheel. The spindle F and the bracket E carried thereby may be locked in any desired position by means of a lock nut F² threaded on to the spindle and adapted to be screwed against the aforesaid hand wheel.

One example of means for adjusting the knives in the knife levers so that they may be set accurately in order to effect proper cutting and also to compensate for shortening of the knives due to repeated sharpening thereof is shown in Figs. 5, 6 and 7. In this example each knife A may be fitted in a dove-tail groove A' formed in a holder A² which is split, as shown in Fig. 6, to give a spring grip effect to insure that the knife cannot be displaced vertically or radially in the holder and the knife is retained in position by a screw A³ engaging the split ends of the holder A² as shown in Fig. 6. The holder A² is retained in a boss on the knife lever by a pin A⁴ and a screw plug A⁵ is threaded into the holder for adjusting the knife longitudinally when the adjusting screw A³ is slackened. In the example shown in Figs. 8 and 9 in which the cutting device is arranged at the lower part of the core, the parts are constructed and arranged substantially as hereinbefore described in connection with the foregoing example and similar reference letters are used to denote the corresponding parts. Instead of using a hand lever for actuating the knife levers a pivoted foot lever B⁶ is adapted to engage with the bar B⁴ carrying the rollers B⁵ which engage with the inclined surfaces B³ on the knife levers B. The outer knife is guarded by means of a shield E² carried on a bracket E³ which is secured on to the main bracket E and has formed upon it suitable facings E⁴ which engage with projections E⁵ on the knife arms. The facings E⁴ engaging with the projections E⁵ on the knife arms hold the knife arms in the outward position so as to hold the knives well away from the casing in all positions except the vertical position to which the knives can be moved by depressing the lever B⁶ and thereby angularly moving the frame C so that in the vertical position the projections E⁵ no longer engage with the facings E⁴ thus leaving the knife levers free to be moved to effect the cutting operation by further depressing the foot lever B⁶. By means of this arrangement the knives are positively prevented from contacting with the core and the casing thereon except in the correct cutting position and moreover the shield E² prevents the likelihood of injury to the operator by the outer knife; a similar shield may be provided for the inner or rear knife. Vertical adjustment of the cutting device may be effected by the nut F' on the threaded end of the spindle F; in this example it is not necessary to angularly move the bracket E to place the device in an inoperative position as the placing of the knives in the position shown in Fig. 8 maintains them in a position well away from the casing and the core and owing to the device being located at the lower part of the core it is not likely to interfere with the manipulation of the core or the casing. This construction of the device is particularly advantageous for the reason that the operator in depressing the foot lever stands in a position at the side of the machine looking in the direction of the plane of the core, so that he has an unobstructed view of both knives in operation.

What we claim and desire to secure by Letters Patent of the United States is:—

1. A bead trimming device for case making machines comprising pivoted knife arms or levers mounted on an angularly movable support or frame and an actuating lever adapted to be moved in the vertical plane of the core in order to move the knife arms or levers from an inoperative position into a position ready for cutting whereupon a continued movement of the actuating lever in the same direction causes lateral movement of the knife arms or levers on their pivots to bring the knives or cutters into engagement with the surplus material at the beads of the casing on the core.

2. A bead trimming device for case making machines comprising pivoted knife arms or levers mounted on an angularly movable support or frame, and an actuating lever which coöperates with the knife arms or levers in such manner that in being actuated to move the said knife arms or levers on their pivots into the cutting position, the mechanical advantage is progressively reduced and resistance to the movement of the actuating lever progressively increased with the result that the knives are prevented from being forced with undue pressure against the sides of the core during the cutting or trimming operation.

3. A bead trimming device for case making machines, comprising pivoted knife arms or levers mounted on an angularly movable support or frame and fixed guards or shields for the knives or cutters.

4. A bead trimming device for case making machines comprising a support on which the knife arms or levers are pivoted and which is angularly movable on a horizontal axis, an actuating lever disposed in a plane between the said knife arms or levers in the vertical plane of the core and means connected to the said hand lever and adapted to engage with the knife arms or levers so that by moving the actuating lever in the vertical plane of the core, the support is rocked on the horizontal axis to bring the knife arms into a radial position relatively to the core whereupon the actuating lever is further moved in the said plane and rocked on its pivot in order to effect lateral movement of the knife arms or levers against the action of a spring.

5. A bead trimming device for case making machines comprising a support on which the knife arms or levers are pivoted and which is angularly movable on a horizontal axis, an actuating lever disposed in a plane between the said knife arms or levers in the vertical plane of the core and means connected to the said hand lever and adapted to engage with the knife arms or levers so that by moving the actuating lever in the vertical plane of the core, the support is rocked on the horizontal axis to bring the knife arms into a radial position relatively to the core whereupon the actuating lever is further moved in the said plane and rocked on its pivot in order to effect lateral movement of the knife arms or levers against the action of a spring, said actuating lever being connected to a bar or the like disposed between and adapted to be moved against inclined surfaces on the outer ends of the knife arms.

6. A bead trimming device for case making machines comprising a support on which the knife arms or levers are pivoted and which is angularly movable on a horizontal axis, an actuating lever disposed in a plane between the said knife arms or levers in the vertical plane of the core and means connected to the said hand lever and adapted to engage with the knife arms or levers so that by moving the actuating lever in the vertical plane of the core, the support is rocked on the horizontal axis to bring the knife arms into a radial position relatively to the core whereupon the actuating lever is further moved in the said plane and rocked on its pivot in order to effect lateral movement of the knife arms or levers against the action of a spring, said actuating lever being connected to a bar or the like disposed between and adapted to be moved against inclined surfaces on the outer ends of the knife arms, and the said bar or the like connected to the actuating lever in such a manner as to be capable of angular movement.

7. A bead trimming device for case making machines, comprising an arm or bracket mounted on the main frame angularly movable knife arms supported on said bracket, inclined surfaces on said knife arms, pressure means coöperating with said inclined surfaces for bringing the knives into the cutting position and means for adjusting the bracket on the main frame with the said pressure means so that the whole device can be adjusted for enabling the knives to be placed in the required positions to suit cores and casings of different diameters.

8. A bead trimming device for case making machines comprising knife arms or levers pivoted on a support capable of angular movement on a horizontal spindle and an actuating lever for effecting the said movement of the knife arm support and also for effecting lateral movement of the knife arms or levers to bring the knives into engagement with the surplus material at the heads, the said spindle being mounted in a bracket or arm which is angularly movable on a vertical axis so that the knife arms or levers may be moved to and retained in a position at the rear of the main frame.

9. A bead trimming device as claimed in claim 8, in which the aforesaid spindle is adapted to engage with a guide or facing on the main frame in order to prevent angular movement of the spindle and the knife arms or levers carried thereby during the movement of the supporting arm or bracket on its vertical axis, the said spindle also being adapted to engage with the main frame in such manner as to lock the knife arms or levers against angular movement on the vertical axis when they are being moved laterally on their pivots into the cutting position.

10. A bead trimming device comprising pivoted knife arms or levers mounted on a support which is angularly movable on a horizontal axis by means of an actuating lever, which knife arms or levers are adapted to engage with fixed guides or facings to prevent the knife arms or levers from being moved laterally on their pivots during the angular movement on the horizontal axis but on reaching the proper position relatively to the core are free to be moved laterally on their pivots, by continued movement of the actuating lever in order to move the knives against the action of a spring into engagement with the surplus material at the beads.

11. A bead trimming device as claimed in claim 9 in which the one or both of the fixed parts being the guides or facings are formed with shields to protect the knives when in the inoperative position.

12. A bead trimming device comprising angularly movable arms provided with inclined surfaces at one end with which cooperate pressure means for moving the knives carried at the other ends of the said arms into the cutting position, the knives being mounted in split holders held in the knife arms and containing adjusting screws adapted to bear against the inner ends of the said knives to effect the required adjustment of the knives and clamping screws in said split holders for clamping the knives in any position to which they are set by the aforesaid adjusting screws.

COLIN MACBETH.
FRANK FELLOWES.